Nov. 20, 1962 G. J. DI MATTEO 3,065,301

COMMUNICATION SWITCHING ARRANGEMENT

Filed Oct. 19, 1959 2 Sheets-Sheet 1

INVENTOR.
George J. Di Matteo
BY
Morse & Altman
ATTORNEY

Nov. 20, 1962 G. J. DI MATTEO 3,065,301

COMMUNICATION SWITCHING ARRANGEMENT

Filed Oct. 19, 1959 2 Sheets-Sheet 2

INVENTOR.
George J. Di Matteo

BY Morse & Altman

ATTORNEY

United States Patent Office 3,065,301
Patented Nov. 20, 1962

3,065,301

COMMUNICATION SWITCHING ARRANGEMENT

George J. Di Matteo, 215 Oak St., Natick, Mass.

Filed Oct. 19, 1959, Ser. No. 847,233
3 Claims. (Cl. 179—2)

The present invention relates to communication switching systems and, more particularly, to a control switching system for directing flow of intelligence among various communication systems as desired with facility. For example, in dispatching stations for ships, taxis, etc., instructions are received by telephone and relayed through an operator by radio. In such a combination of systems, it is often necessary to avoid any connection between the telephone system and the radio system, as in case where connection between the telephone system and a foreign radio system is prohibited by operation of law.

The present invention contemplates a novel switching system that may be associated with a first communication system, such as a telephone system or the like, having a plurality of land lines for receiving and transmitting modulated direct current signals and a second communication system, such as a radio system or the like, for receiving and transmitting modulated car ier frequency signals. The object of the present invention is to provide a portable switching system, powered entirely by a conventional alternating current source, that may be readily connected between a first system and a second system in such a way as to permit an operator to maintain contact with both systems while preventing their contact with each other but nevertheless isolating the circuitry of the first system from the circuitry of the second system.

Other objects of the present invention will in part be obvious and will in part appear hereinafter.

The invention accordingly comprises the system possessing the construction, combination of elements and the arrangement of parts, which are exemplified in the following detailed disclosure, and the scope of which will be indicated in the appended claims.

For a fuller understanding of the nature and objects of the present invention, reference should be had to the following detailed description, taken in connection with the accompanying drawing, wherein.

Figure 1:
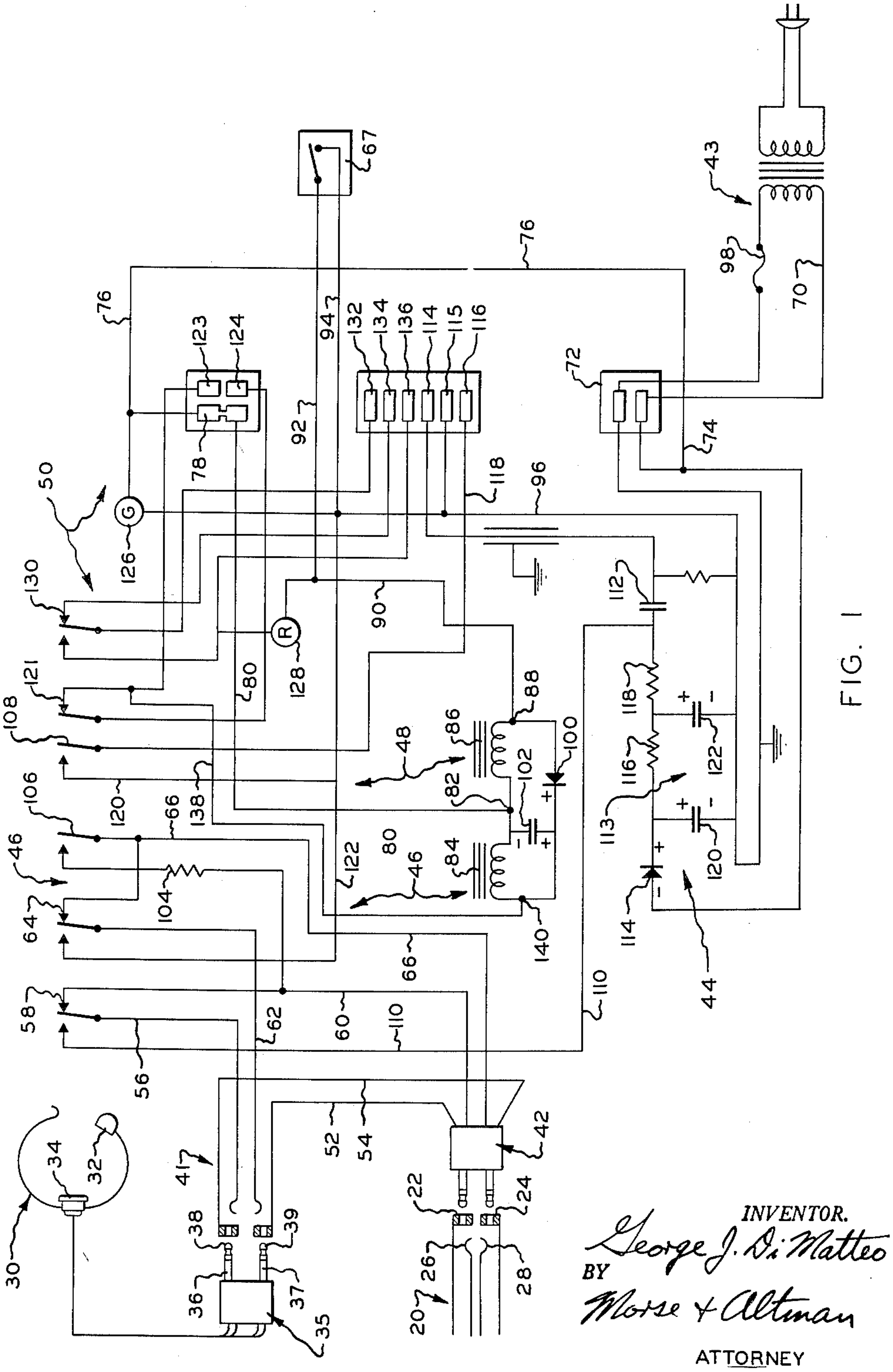
FIG. 1 is a schematic diagram of a preferred system embodying the present invention.
Figure 2:
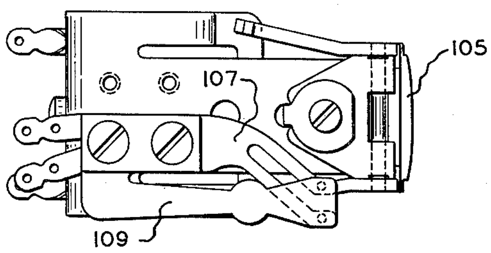
FIG. 2 is a top plan view of a component of the circuit of FIG. 1.
Figure 3:
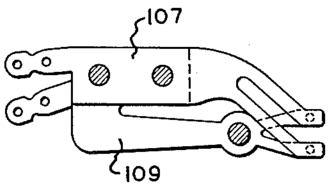
FIG. 3 is a detail view of a pair of elements of the component of FIG. 2.
Figure 4:
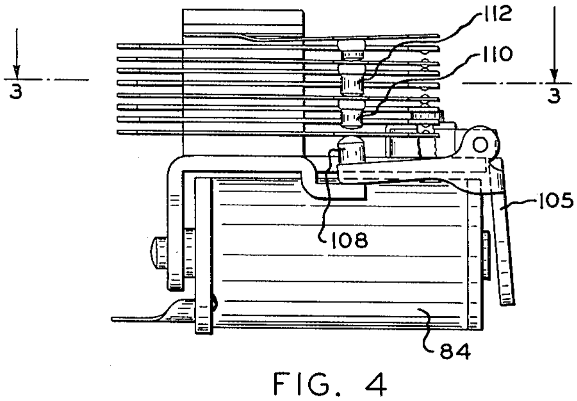
FIG. 4 is a side elevation of the component of FIG. 2 in inoperative condition.
Figure 5:
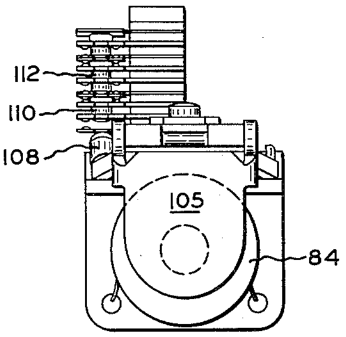
FIG. 5 is an end elevation of the component of FIG. 2.
Figure 6:
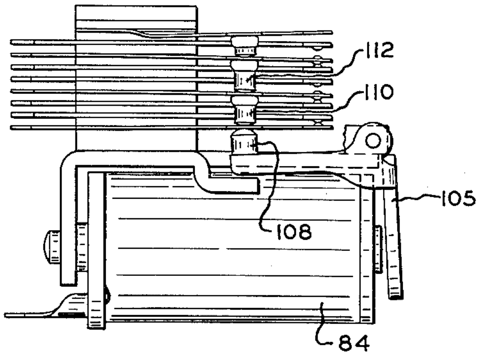
FIG. 6 is a side elevation of the component of FIG. 2 in a first operative condition.
Figure 7:
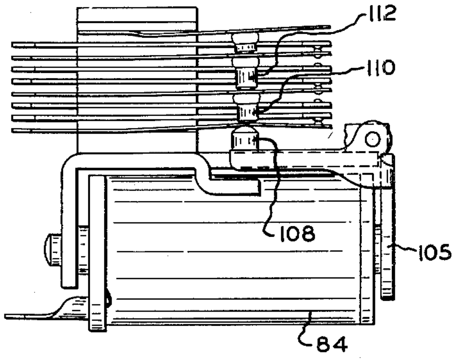
FIG. 7 is a side elevation of the component of FIG. 2 in a second operative condition.

Generally the illustrated system is designed for association with a telephone switchboard of the type comprising a jack assembly 20 including a pair of jacks 22 and 24 and a pair of detents 26 and 28. Adapted for interconnection with assembly 20 is an operator headset assembly 30 comprising a microphone 32 and a speaker 34. Microphone 32 and speaker 34 are provided with terminals in the form of a pin assembly 35 including a pair of pins having inner portions 36 and 37 and outer portions 38 and 39. The inner and outer portions are insulated from each other. Portions 36 and 37 represent the terminals of speaker 34 and portions 38 and 39 represent the terminals of microphone 32. In conventional fashion, headset pin assembly 35 is designed to be connected to switchboard jack assembly 20 in such a way that jacks 22 and 24 receive inner portions 36 and 37 and detents 26 and 28 are in contact with outer portions 38 and 39. In order to interconnect the illustrated control system with jack assembly 20 of the telephone system and pin assembly 35 of headset 30, the control system is provided with: a jack assembly 41, which corresponds to jack assembly 20, for mating with pin assembly 35; and a pin assembly 42, which corresponds to pin assembly 35, for mating with jack assembly 20. Generally, the illustrated control system comprises an alternating current power supply including a step-down transformer 43, a rectifying circuit 44, a telephone system switching circuit 46, a radio system switching circuit 48 and an auxiliary system lockout circuit 50.

Normally when pin assembly 35 of headset 30 is mated with jack assembly 41 and pin assembly 42 is mated with jack assembly 20 of the telephone system: inner portions 36 and 37 of the pins are connected by the jacks which receive them through leads 52 and 54 to corresponding jacks 22 and 24 of the telephone system; outer portion 38 is connected through a lead 56, a switch position 58 and a lead 60 to detent 26; and end portion 39 is connected through a lead 62, a switch position 64 and a lead 66 into contact with detent 28.

When microphone communication with the telephone system is to be broken and microphone communication with the radio system is to be made, a switch 67 is actuated by the foot or the like of the operator. Actuation of switch 67 applies an alternating current from power supply 43 through lead 70, plug 72, lead 74, lead 76, terminal junction 78, terminal junction 79, lead 80 to the junction 82 of a pair of relay coils 84 and 86. The current is returned to ground from another junction 88, through lead 90, lead 92, switch 67, lead 94, lead 96, plug 72, fuse 98 to power supply 43.

The alternating current is applied directly to relay coil 86 but is rectified before being applied to relay coil 84. Rectification is effected by a rectifier 100 and a low frequency shunt capacitor 102. The coils of this particular combination thus are energized by a single alternating current source and yet are isolated from each other in effect.

In order to hold the telephone microphone circuit open when switch 67 is actuated, a resistor 104 is applied across leads 60 and 66 by a switching position 106 that operates before remaining switching positions 58 and 64 operate. The operation of a typical switch of this type is shown in FIGS. 2 through 7. This switch includes relay coil 84, shown electrically in FIG. 1, a bell crank 105 that is actuated by coil 84, and a series of pairs of spring contacts 107 and 109, of which contacts 107 are stationary and contacts 109 are movable. Blades 109 are provided with pins which operate as follows. When coil 84 is energized a pin 108 first closes lowermost blade 109 and then contacts similar pins 110 and 112. Pins 110 and 112 then close the upper blades 109. When relay 84 is so energized, switching position 108 of relay 86 also is energized. Under these circumstances, modulated direct current flows through leads 56 and 110, coupling condensed 112 to the mike connection of the radio system, designated by 114, and is returned from connection 115 through lead 96, lead 122, switching position 64 and lead 62 to headset 30. At the same time switch 108 operates to connect push-to-talk contact 116 through lead 118 to ground. It will be observed that direct current is supplied to headset 30 through lead 110 by power supply 43 through a bridging circuit 44, which serves to rectify the applied alternating current by a rectifier 114, associated series resistors 116 and 118 and shunting capacitors 120 and 122.

The remaining switching positions of relay 86 are designed to cooperate with lockout circuit 50 in such a way that when two or more of the illustrated control systems are used in conjunction by two or more operators, it is impossible for one operator to inadvertantly transmit via the radio system when it is in use by another operator. Thus when two such control systems are in use simultaneously, if one of the operators actuates switch 67, switching position 121 is opened and the current applied through terminals 123 and 124 by the associated control system is interrupted, by which inadvertent transmission is rendered impossible. It will be observed that under these conditions a red light in the associated control system, corresponding in position to red light 128, is switched on. Green light 126 indicates power is on. Also provided is another switching position 130 in association with terminals 132, 134 and 136 for controlling the operation of any other communications systems in association with the control system illustrated. A lead 138 is connected from terminal 140 at an extremity of coil 84 to terminal 123 for use when three or more control systems of the illustrated type are employed simultaneously.

The present invention thus provides a simple alternating current supply for actuating interrelated control components for a direct current telephone system and a high frequency radio system, while isolating the telephone system from stray effects of the radio system.

Since certain changes may be made in the above system without departing from the scope of the invention herein involved, it is intended that all matter contained in the above specification or shown in the accompanying drawing shall be interpreted in an illustrative and not in a limiting sense.

What is claimed is:

1. A self powered switching unit for use between a first communication system and a second communication system, said first communication system including first network means and first transducer means, said second communication system including second network means and second transducer means, said switching unit including first switching means and second switching means, said first switching means having first terminal means and second terminal means, said second switching means having first terminal means and second terminal means, said first terminal means of said first switching means being operatively connected to said first network means, said second terminal means of said first switching means being operatively connected to said first transducer means, said first terminal means of said second switch means being operatively connected to said second network means, said second terminal means of said second switching means being operatively connected to said second transducer means, said first switching means when actuated operatively interconnecting said first network means and said first transducer means, said second switching means when actuated operatively interconnecting said second network means and said second transducer means, actuating means for deactuating said second switching means when said first switching means is actuated and for deactuating said first switching means when said second switching means is actuated, transformer means for receiving an alternating current from a source and means for supplying power from said transformer means to said first switching means and said second switching means.

2. The switching system of claim 1 wherein said first switching means when deactuated places a resistor across said first terminal means of said first switching means.

3. The switching system of claim 1 wherein said last mentioned means includes a rectifying means for supplying direct current to said first switching means.

References Cited in the file of this patent

UNITED STATES PATENTS

| | | |
|---|---|---|
| 1,688,454 | Demarest | Oct. 23, 1928 |
| 2,564,048 | Bartelink | Aug. 14, 1951 |
| 2,754,366 | Di Matteo | July 10, 1956 |